(12) United States Patent
Montwill

(10) Patent No.: US 7,860,017 B2
(45) Date of Patent: Dec. 28, 2010

(54) NETWORK ASSESSMENT AND FAULT ISOLATION

(75) Inventor: Maciej Montwill, Germantown, MD (US)

(73) Assignee: Cisco Technology, Inc., San Jose, CA (US)

( * ) Notice: Subject to any disclaimer, the term of this patent is extended or adjusted under 35 U.S.C. 154(b) by 122 days.

(21) Appl. No.: 12/258,646

(22) Filed: Oct. 27, 2008

(65) Prior Publication Data

US 2010/0103822 A1 Apr. 29, 2010

(51) Int. Cl.
*G01R 31/08* (2006.01)
(52) U.S. Cl. .................................................. 370/242
(58) Field of Classification Search ............... None
See application file for complete search history.

(56) References Cited

U.S. PATENT DOCUMENTS

| | | | | |
|---|---|---|---|---|
| 5,923,854 | A * | 7/1999 | Bell et al. | 709/243 |
| 5,951,650 | A * | 9/1999 | Bell et al. | 709/238 |
| 6,980,526 | B2 | 12/2005 | Jang et al. | |
| 7,447,149 | B1 * | 11/2008 | Beesley et al. | 370/217 |
| 7,496,044 | B1 * | 2/2009 | Wing | 370/242 |
| 7,519,006 | B1 * | 4/2009 | Wing | 370/252 |
| 7,680,920 | B2 * | 3/2010 | Selvaggi et al. | 709/224 |
| 2002/0194361 | A1 * | 12/2002 | Itoh et al. | 709/233 |
| 2004/0193709 | A1 * | 9/2004 | Selvaggi et al. | 709/224 |
| 2006/0015607 | A1 * | 1/2006 | Fava et al. | 709/224 |
| 2007/0121486 | A1 * | 5/2007 | Guichard et al. | 370/216 |
| 2007/0230361 | A1 * | 10/2007 | Choudhury | 370/250 |
| 2007/0283042 | A1 * | 12/2007 | West et al. | 709/238 |
| 2008/0031145 | A1 * | 2/2008 | Ethier et al. | 370/248 |
| 2009/0003195 | A1 * | 1/2009 | Pitchforth, Jr. | 370/218 |
| 2009/0257361 | A1 * | 10/2009 | Deshpande et al. | 370/252 |
| 2009/0316570 | A1 * | 12/2009 | Bell | 370/218 |

OTHER PUBLICATIONS

Cisco Systems, Inc., Cisco Telepresence Readiness Assessment Manager 1.0—Q&A, Dec. 2007, pp. 1-5.

* cited by examiner

*Primary Examiner*—Chi H Pham
*Assistant Examiner*—Fan Ng
(74) *Attorney, Agent, or Firm*—Edell, Shapiro & Finnan, LLC

(57) ABSTRACT

Fault isolation in a network includes embedding in-band traceroute packets in a media stream, passing the traceroute packets into a network connecting a proximal end point and a distal end point, monitoring the network for responses, expected from respective traceroute packets, from each of a plurality of network devices that are disposed between the proximal and distal end points; analyzing the respective responses; and based on the analyzing step, identifying one or more of the network devices as being responsible for a fault. In a preferred embodiment, fault isolation further includes correlating un-acknowledged, i.e., un-responded, traceroute packets with packet loss and or jitter computed at the distal end point.

17 Claims, 8 Drawing Sheets

Media Frame 1

- ▷ TTL=64, Seq=1, Ts=3000Hz, Tm=33.33ms
- ▷ TTL=64, Seq=2, Ts=3000Hz, Tm=39.33ms
- ▷ TTL=64, Seq=3, Ts=3000Hz, Tm=45.33ms
- ▷ TTL=64, Seq=4, Ts=3000Hz, Tm=51.33ms

Traceroute Frame 2

- ▷ TTL=1, Seq=5, Ts=6000Hz, Tm=66.67ms
- ▷ TTL=2, Seq=6, Ts=6000Hz, Tm=72.67ms
- ▷ TTL=3, Seq=7, Ts=6000Hz, Tm=78.67ms
- ▷ TTL=4, Seq=8, Ts=6000Hz, Tm=84.67ms

Media Frame 3

- ▷ TTL=64, Seq=9, Ts=9000Hz, Tm=100.00ms
- ▷ TTL=64, Seq=10, Ts=9000Hz, Tm=106.00ms
- ▷ TTL=64, Seq=11, Ts=9000Hz, Tm=112.00ms
- ▷ TTL=64, Seq=12, Ts=9000Hz, Tm=118.00ms

FIG.5

Router Responses

☐ Node 1 - ICMP Time Exceeded
☐ Node 2 - ICMP Time Exceeded

Consecutive Response Gap

☐ Node 6 - ICMP Time Exceeded
☐ Node 7 - ICMP Time Exceeded
☐ Node 8 - ICMP Time Exceeded

Traceroute Frame

△ TTL=1, Seq=1, Tm=0ms
△ TTL=2, Seq=2, Tm=2.57ms
△ TTL=3, Seq=3, Tm=5.14ms
△ TTL=4, Seq=4, Tm=7.71ms
△ TTL=5, Seq=5, Tm=10.28ms
△ TTL=6, Seq=6, Tm=12.86ms
△ TTL=7, Seq=7, Tm=15.43ms
△ TTL=8, Seq=8, Tm=18ms

FIG.6

NETWORK ASSESSMENT AND FAULT ISOLATION

TECHNICAL FIELD

Embodiments of the present invention are related to network assessment and, more particularly, identifying problem nodes between two end points using traceroute packets.

BACKGROUND

Deploying a broadband video conferencing application, such as a service known as "Telepresence" (available from Cisco, San Jose, Calif.), may require an assessment of the data network to determine whether it can handle the high bandwidth and real-time needs of the endpoints. Simulated media IP traffic can be generated and analyzed at each endpoint to determine whether network properties such as packet loss and jitter are within tolerated thresholds. If it is determined that the network is not suitable for video conferencing (or other desired) application, further problem isolation may need to be performed to determine which of many possible intermediate devices, such as routers, may be at fault. Effective and accurate systems and methods are therefore desirable to determine the root cause of such faults.

BRIEF DESCRIPTION OF THE DRAWINGS

FIG. 5 shows a sample media stream with embedded traceroute packetization;

FIG. 6 shows missing responses from selected traceroute packets;

DESCRIPTION OF EXAMPLE EMBODIMENTS

Overview

Although the following example embodiments are described primarily in the context of the Telepresence application marketed by Cisco, those skilled in the art will appreciate that the principles of the present invention are equally applicable to any end-to-end packetized stream that traverses a network that includes one or more nodes (such as routers) and for which network suitability information may be desired.

In accordance with an embodiment of the present invention, a simulated packetized stream (data, audio, video, etc.) which accurately models the bandwidth and burst characteristics of Telepresence traffic periodically injects special traceroute packets for path diagnosis. The embedded traceroute packet timing coincides with the actual end-to-end Telepresence packets to perform fault isolation. In addition to doing path discovery, intermediate network devices responsible for incurring jitter and packet loss can be accurately identified and the network problem addressed.

Existing assessment tools such as IP Service level Agreement (IPSLA) may not closely model actual Telepresence traffic and is not capable of performing fault isolation.

In a controlled wide area network (WAN) environment it may be possible to gain access to each intermediate router to determine the number of packet forwarding discards and queuing delay statistics, however, such metrics may not be pertinent to a given Telepresence stream alone. Furthermore, this method is very time consuming and requires credentials to all intermediate devices.

Traditionally, traceroute has been used to determine a network path. In addition, traceroute can also be used to show the number of "un-responded" intermediate nodes and even the roundtrip jitter of the traceroute packets to try to isolate network faults. Such a traceroute has to be run concurrently with the simulated Telepresence traffic to ensure the network is under load. Unfortunately, a problem with running an independent traceroute application is that the traceroute traffic being analyzed is too independent from the simulated Telepresence traffic, and thus may not respond to the same network burst characteristics to properly reflect network faults.

Figure 1:
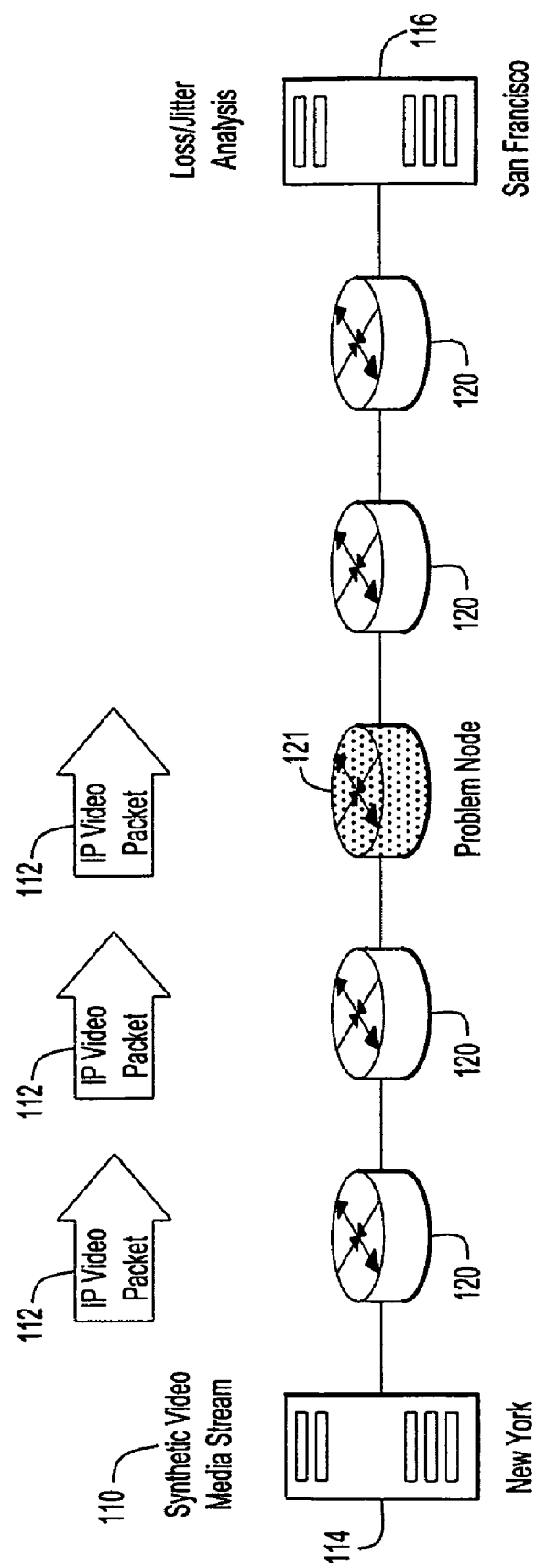
FIG. 1 depicts a simplified network in which embodiments of the present invention may be implemented.

Referring now to FIG. 1, a synthetic video stream 110 comprising a plurality of packets 112 (in this case IP video packets, but which may also comprise audio and/or data packets) is transmitted, from one (proximal) end point 114 (New York) to another (distal) end point 116 (San Francisco) via a plurality of network nodes, e.g., routers 120. As shown in FIG. 1, router 121 is a "problem node" that, for reasons unknown, is dropping packets or is causing increased jitter at end point 116. As shown, end point 116 preferably performs packet loss and jitter analysis, the results of which, as will be described in more detail below, are supplied to the end point 114 in order to more accurately identify problem nodes between the end points 114, 116.

Figure 2:
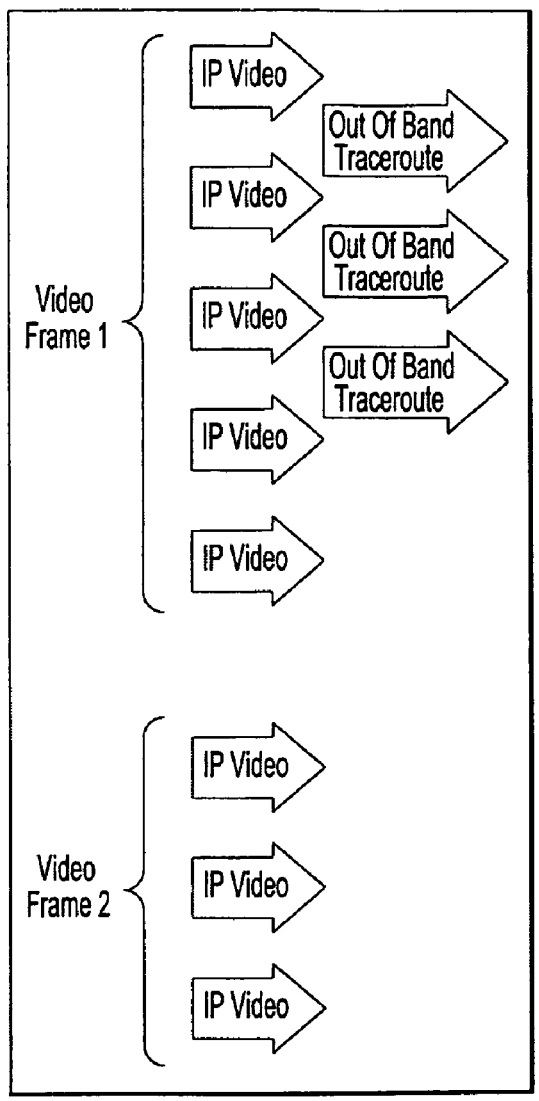
FIG. 2 schematically depicts an out-of-band prior art methodology for performing fault isolation.
Figure 3:
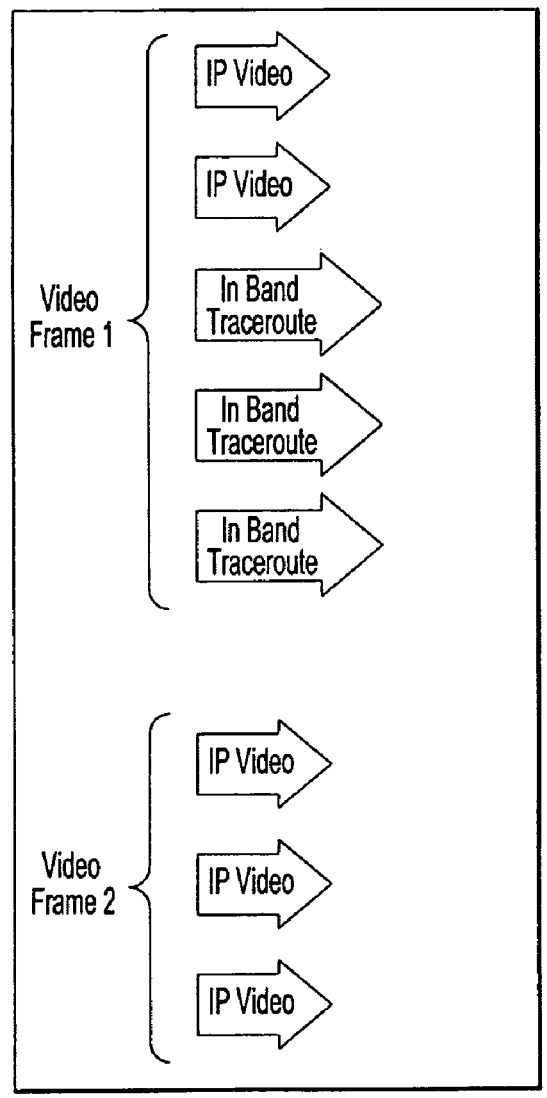
FIG. 3 schematically depicts in-band traceroute packets in accordance with an embodiment of the present invention.

FIGS. 2 and 3 juxtapose out-of-band and in-band use of traceroute packets. In FIG. 2, out-of-band data microbursts, which are sent separate from packets of a given video frame, may over stress a forwarding queue and thus may lead to false positive indications of problem nodes between endpoints FIG. 3, on the other hand, shows how in-band traceroute packets are configured to be part of a given video frame. As a result, such packets accurately stress a forwarding queue.

Figure 4:
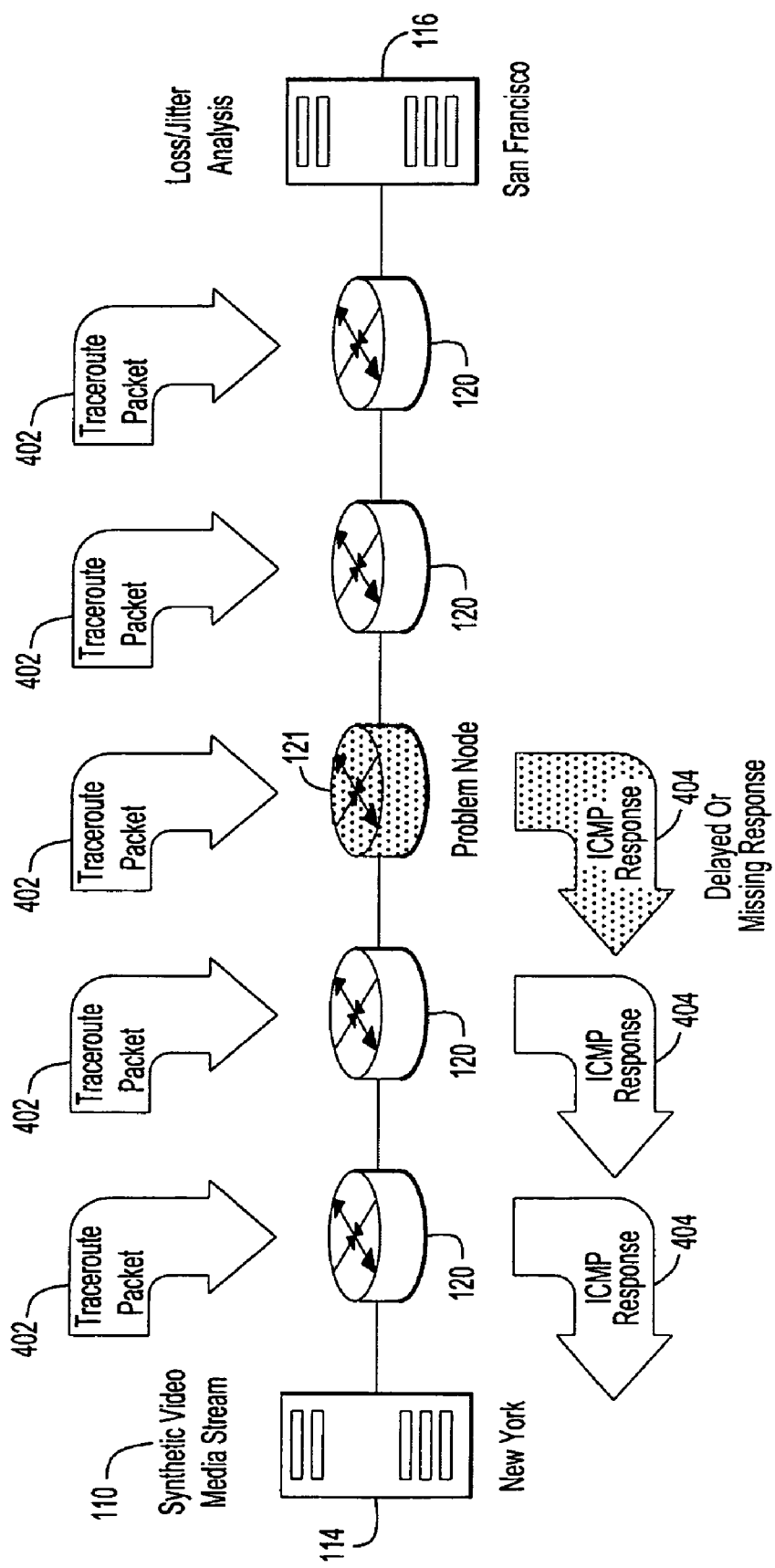
FIG. 4 depicts the simplified network of FIG. 1, including responses from traceroute packets in accordance with an embodiment of the present invention.

FIG. 4 depicts the simplified network of FIG. 1, including responses 404 from traceroute packets in accordance with an embodiment of the present invention. More specifically, a series of traceroute packets are transmitted from one end point 114 towards end point 116. Each traceroute packet is intended to prompt an Internet Control Message Protocol (ICMP) Response 404 from respective nodes 120. As shown, problem node 121 either returns a delayed ICMP response, or no ICMP Response at all (not shown). The last two nodes prior to end point 116 fail to return any ICMP Responses. With this information and the packet loss/jitter analysis provided by end point 116, it is possible to more accurately identify the problem node 121 in the network.

An even more detailed explanation of the foregoing is provided below. Common traceroute uses small ICMP packets with an incrementing IP TTL (time to live) field used to primarily determine the network path between two endpoints. Each intermediate router forwarding a packet on its way to the final destination must decrease the IP TTL field by one. If the IP TTL field is not greater than one during forwarding, the packet is rejected and an ICMP Time Exceeded message (i.e., the ICMP Response message shown in FIG. 4) is sent back to the transmitter.

In case the packet is traversing any devices performing packet introspection above the IP level, such as a firewall, the traceroute preferably sends RTP packets using the same UDP ports, RTP Synchronization Source Identifier (SSRC), as well as RTP sequence and timestamp fields coinciding with the actual inline telepresence media traffic. Other than a low IP TTL field, all level packet headers of the traceroute packet should not appear any different than a Telepresence media packet.

It is common for an ICMP responder to throttle the amount of ICMP error messages, such as ICMP Time Exceeded. A common threshold is a maximum of 1 response per sender per second, the significance of which is noted below.

Stream Packetization

A Telepresence media session can consist of separate RTP streams for the video and audio portions, or a multiplexed RTP stream comprising of both video and audio The number and size of RTP packets per video frame depends on the video frame type (I or P), video resolution (1080 p or 720 p), video quality level, and degree of video motion. A high quality Cisco Telepresence stream may send about 17 large RTP packets per frame.

For standard video at a rate of 30 frames per second, the delivery of ~17 packets are done in bursts every 33.33 milliseconds. The degree of the bursts depends on the version of the application being used. It has been observed that traffic from one embodiment spreads bursts over ~18 ms of the 33.33 ms frame interval, thus creating less network microbursts. However, such traffic may have slightly more strict network jitter characteristics due to a slightly less accommodating play-out buffer delay on the receiving endpoint.

Telepresence Media Stream with Embedded Traceroute

A Telepresence stream with embedded traceroute according to embodiments of the present invention periodically injects special traceroute packets. Each traceroute packet intended for the same intermediate router is preferably not transmitted more frequently than once per second due to ICMP response throttling on intermediate routers. The transmission timing of the traceroute packets preferably matches the timing of the actual media packets of all other frames.

FIG. 5 shows a sample media stream with embedded traceroute packetization. Specifically, Media Frame 1 includes packets with time-to-live (TTL) values of 64, which is sufficient to ensure that these packets arrive at the intended end point. As can be seen, the sequence values in Frame 1, a media frame, begin at 1 and are incremented for each successive packet. Ts and Tm values are as shown, where the packets are separated by 6 ms. Although only four packets are shown in FIG. 5, a typical media frame might include 15-18 packets.

Frame 2 in FIG. 5 is a Traceroute frame where regular media packets are replaced by traceroute packets. Here, the TTL values begin at 1 and are incremented for each packet such that each node (e.g., router) that is encountered between the two end points 114, 116, can provide the desired response. The sequence values continue from Frame 1, such that the Traceroute Frame appears as "more of the same" kind of data that has been flowing in the path between the end points. Frame 3 is another regular media frame similar to Frame 1, except that the sequence values continue from Frame 2, thus making each traceroute packet a seamless part of the overall transmission for any intermediate router forwarding such a packet.

In other words, since network path jitter and packet loss can be a property of the media stream burst characteristics affect on queuing, it is preferable that the traceroute packets mimic the properties of the actual media stream being assessed. Accordingly, as shown in FIG. 5, a similar number of packets is included in each of the frames and all of the frames are transmitted is sequence.

Traceroute Response Data

Establishing Network Path Hop Distance

Upon starting a simulated Telepresence media stream with embedded traceroute frames, the network path and hop distance of the final endpoint are preferably first determined. Since the expected number of packets per frame may be less than the hop distance of the final endpoint, each traceroute frame does not have to begin with TTL 1, but can start with an intermediate TTL. If the total hop distance is greater than the size of the traceroute video frame in packets, the transmission frame size can be increased to simulate a frame with increased motion. Alternatively, sub-sections of the entire hop distance can be evaluated per traceroute frame.

Un-Acknowledged Traceroute Packets

It is possible that a particular intermediate router may periodically fail to respond with an ICMP Time Exceeded packet, making it falsely appear as if there is congestion at such a device. This may occur when the lower priority task of responding to ICMP messages is superseded by higher priority routing tasks. With CEF (Cisco Express Forwarding) the routing task is independent from other processing tasks. It is also possible that the ICMP Time Exceeded packet generated by an intermediate router is later dropped by another router, possibly because it may use a different Type of Service (TOS) value. This caveat may make it impractical to interpret individual periodic failures to respond with an ICMP Time Exceeded as actual network loss of the outgoing Telepresence traffic.

For accurate assessment, it is important that any un-acknowledged traceroute packets should be correlated with packet loss at the final end-point prior to performing end-to-end media analysis. If the final endpoint is reporting packet loss at a similar time as the un-acknowledged traceroute frame, there is a good indication that the traceroute frame was not received by the final TTL endpoint router.

Interpreting Un-Acknowledged Packet Gaps

Since outgoing packets are sent in rapid succession (~1-2 ms separation), if each successive outgoing packet of the traceroute frame has an increasing IP TTL value, and no ICMP Time Exceeded message is received from more than one consecutive endpoint, then the probability that one of the links is experiencing a period when it is dropping outgoing Telepresence packets becomes exceedingly high.

More specifically, FIG. 6 shows missing responses from selected traceroute packets. As can be seen, a consecutive response gap results when ICMP Time Exceeded responses are not received from nodes 3, 4, and 5, corresponding to traceroute packets having, in this case, TTL values of 3 and 4 and 5. This gap indicates an increased probability that there was a brief period of congestion that prevented the link between nodes 2 and 3 from forwarding outgoing Telepresence packets.

Network Jitter Fault Isolation

Network jitter can be computed in a way similar to that performed by a stand-alone traceroute program. Although the jitter computed is the round trip transmission jitter (not true one-way jitter affecting outgoing Telepresence packets) it is still a good indicator of general spikes in network latency.

It is useful to maintain a running average latency for each intermediate router based on the last few responded packets.

One or more maximum values can be discarded from the average calculation. An alert identifying a spike in latency can be logged when any single latency exceeds the running average latency beyond a specified threshold. This threshold is the effective peak to peak jitter of the media stream. In practice, the peak-to-peak jitter should not exceed ~30 ms. The alerts identifying a spike in latency deduced from traceroute data can be correlated with the peak-to-peak jitter computed at the destination endpoint for fault isolation.

Due to the low thresholds of tolerated packet loss for a high quality Telepresence session (or, again, any type of data/media session), the simulated Telepresence stream with embedded traceroute is preferably run for an extended duration of at least one hour. Suggested traceroute frame transmission frequency is 1.5 seconds (45 video frames). At this rate, 2400 traceroute frames are transmitted per hour for a granularity of ~0.04% detectable packet loss for each intermediate node.

Figure 7:
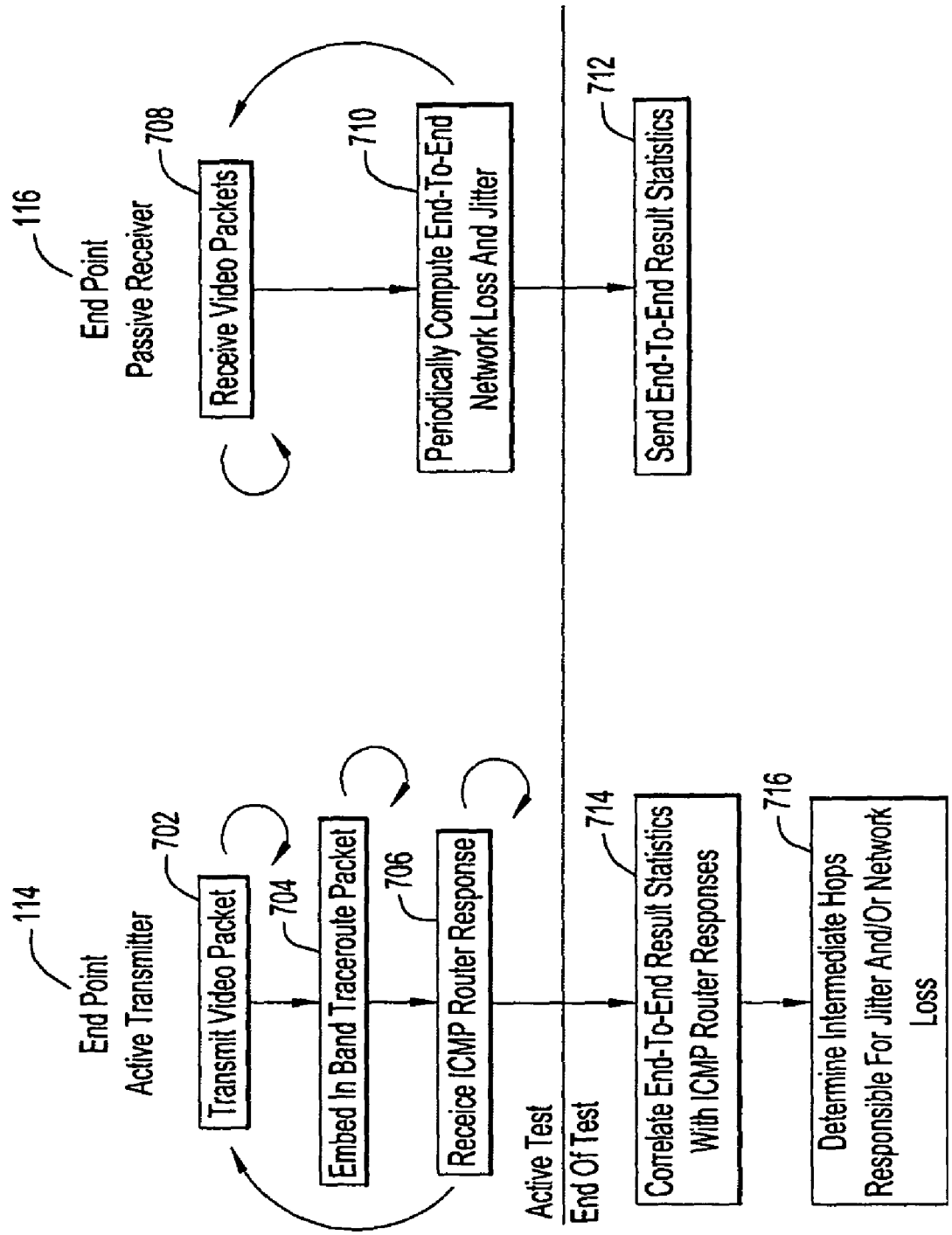
FIG. 7 depicts an example flow diagram of a testing and analysis procedure in accordance with an embodiment of the present invention.

FIG. 7 depicts an example flow diagram of a testing and analysis procedure in accordance with an embodiment of the present invention. As shown, end point 114 operates an active transmitter, while end point 116 functions as a passive receiver. At step 702 the active transmitter transmits multiple packets per video frame). At step 704, the active transmitter embeds in-band traceroute packets. In response to the traceroute packets, the active transmitter receives respective ICMP router responses at step 706.

Meanwhile, at the passive receiver, the video packets transmitted at step 702 are successively received at step 708, and at step 710, in accordance with well-known techniques, the passive receiver periodically computes end-to-end network loss (e.g., by detecting missing sequence values) and jitter (e.g., by monitoring reception time of selected packets). Ultimately, computed end-to-end result statistics (packet loss and jitter) are sent to end point 114 at step 712.

With the end-to-end result statistics in hand, end point 114, at step 714, correlates the data with ICMP router responses, and at step 716 determines intermediate hops responsible for jitter and/or network loss. The correlation process and any data exchange can be performed after the test has been completed.

Figure 8A:
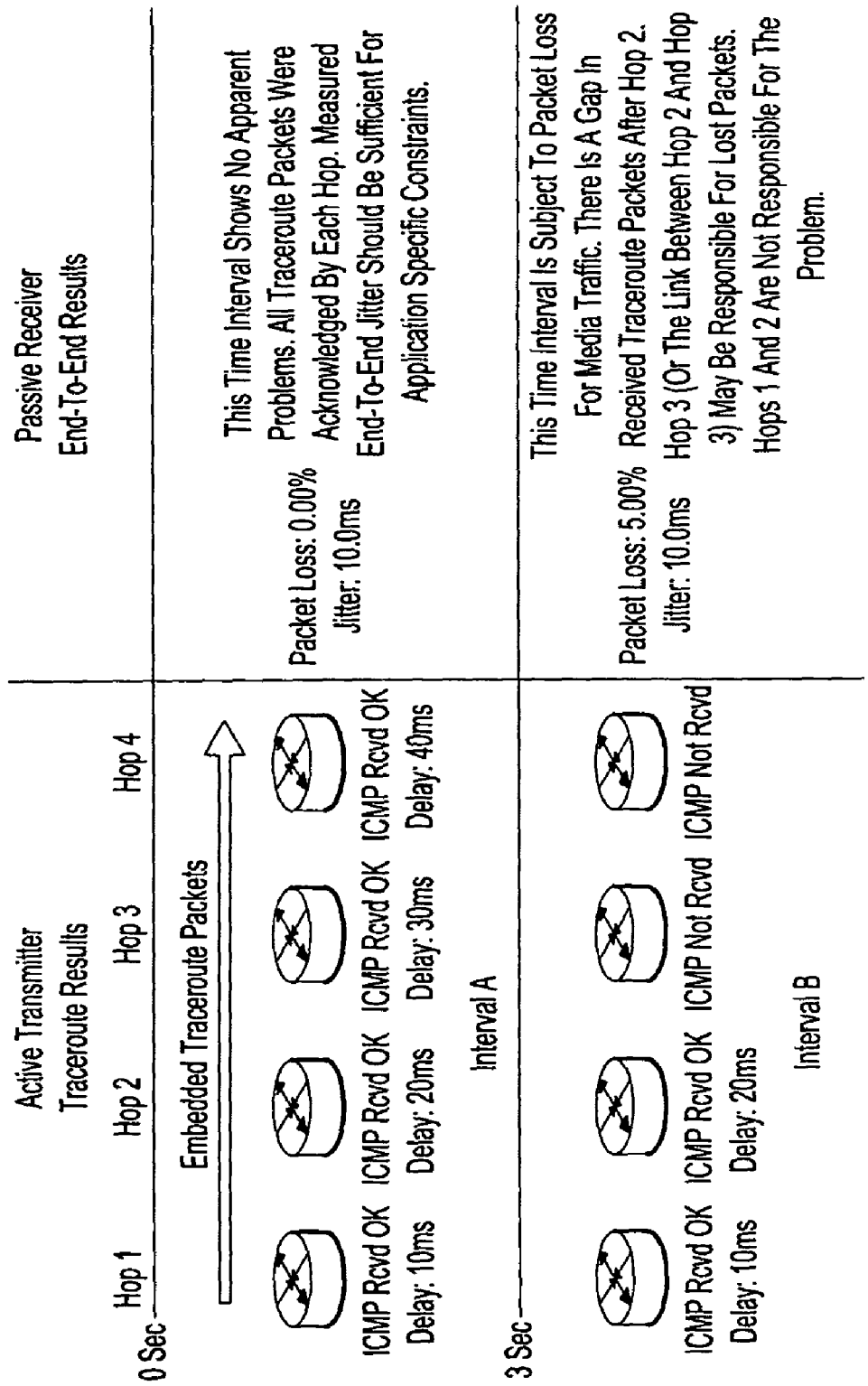
FIGS. 8A and 8B show several timing intervals for traceroute packet results at the transmitter side and end-to-end results at the receiver side in accordance with an embodiment of the present invention.
Figure 8B:
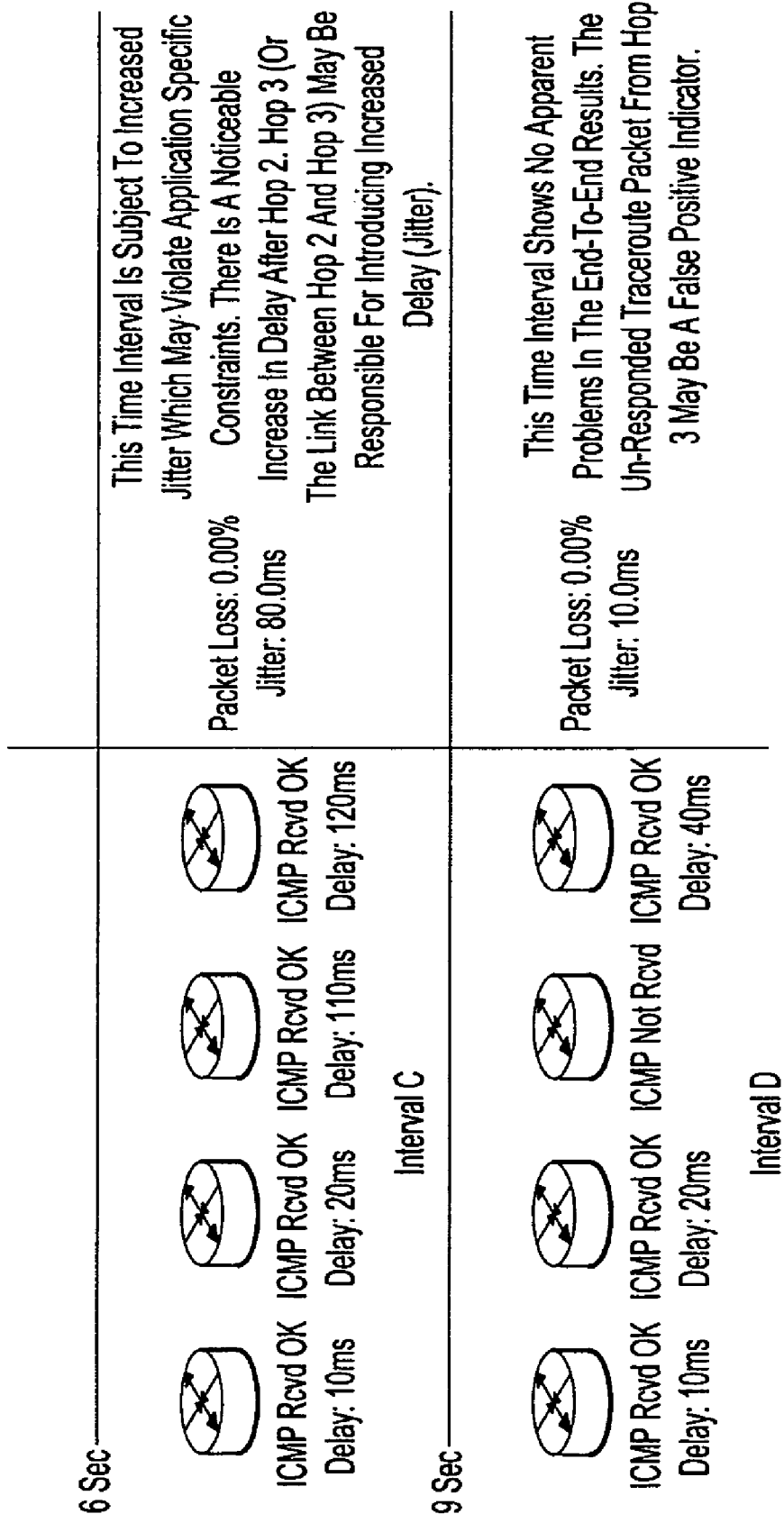

FIGS. 8A and 8B show several timing intervals for traceroute packet ICMP results at the transmitter side and end-to-end results at the receiver side in accordance with an embodiment of the present invention. During time interval A, no apparent problems are indicated. All traceroute packets were acknowledged by each hop. Measured end-to-end jitter (10 ms) is within an adequate range for application specific constraints.

During time interval B, packet loss is experienced. There is a gap of un-received traceroute packets after hop 2.hop 3 (or the link between hop 2 and hop 3) may be responsible for lost packets. Hops 1 or 2 are not responsible for the problem.

Time interval C shows increased jitter that may violate application specific constraints. There is a noticeable increase in delay after hop 2. Hop 3 (or the link between hop 2 and hop 3) may be responsible for introducing increased delay (jitter).

Finally, time interval D shows no apparent problems in the end-to-end results. The un-responded traceroute packet from hop 3 may be a false positive indicator. This can be further inferred by correlating data for the given time interval with the destination end-point reception statistics.

As indicated previously, a feature of embodiments of the present invention is that the traceroute media stream being transmitted accurately and exactly emulates the target media stream from the view point of any intermediate router, firewall, or media gateway. Loss and jitter characteristics can be extremely dependant on the micro packet transmission properties, such as packet spacing and sizes, which may translate into overflowing forwarding/introspection queues or adjusted delay properties at the router. An application that does simultaneous out-of band traceroute for the purpose of fault isolation may not accurately simulate the load characteristics of the emulated target media stream. For example, assuming a network can only accommodate the reliable delivery of one Telepresence stream, use of additional out-of-band traceroute packets mimicking an encoded video frame would further stress the network (bandwidth burst) resulting in misleading reports of unreliable delivery. Furthermore, intermediate nodes performing IP introspection above layer 3, (firewalls, media gateways, application gateways) should process every packet of the simulated media stream and forwarded traceroute packets as if it were the actual target media stream. A traceroute packet should be transmitted only when replacing a regular media packet. The transmission time of such packet should match the transmission time of the replaced packet.

Use of rapidly successive traceroute packets inline with the media stream allows for more accurate methods of interpretation of responses. Use of a stand-alone traceroute application for fault isolation purposes may not be sufficient because actual networks may not guarantee that an ICMP error message is actually received by the original sending party. This may be due to congestion (the replying ICMP packet may use a lower priority IP TOS value) on the network, or at any intermediate router. The result in most cases may be false positive indications that a packet was dropped, or greatly delayed, where the delay was actually present only in the responding ICMP error packet, not in the outbound RTP media packet. Transmitting in-band traceroute packets in the following fashion allows the application to make the following conclusions.

Assuming most of the time the response is as shown in Table 1, a baseline can be established.

TABLE 1

| TTL 1 | xmit | 0 ms | delay | 20 ms |
| TTL 2 | xmit | 1 ms | delay | 30 ms |
| TTL 3 | xmit | 2 ms | delay | 40 ms |
| TTL 4 | xmit | 3 ms | delay | 50 ms |
| TTL 5 | xmit | 4 ms | delay | 60 ms |
| TTL 6 | xmit | 5 ms | delay | 70 ms |
| TTL 7 | xmit | 6 ms | delay | 80 ms |
| TTL 8 | xmit | 7 ms | delay | 90 ms |
| TTL 9 | xmit | 8 ms | delay | 100 ms |
| TTL 10 | xmit | 9 ms | delay | 110 ms |

Then, as shown in Table 2, if just one traceroute packet was returned with a delay, the result may be inconclusive. There may have been an actual delay at node TTL=5, or perhaps the ICMP TTL=5 packet was delayed on its return path.

TABLE 2

| TTL 1 | xmit | 1 ms | delay | 20 ms | |
| TTL 2 | xmit | 2 ms | delay | 30 ms | |
| TTL 3 | xmit | 3 ms | delay | 40 ms | |
| TTL 4 | xmit | 4 ms | delay | 50 ms | |
| TTL 5 | xmit | 5 ms | delay | 100 ms | <-- inconclusive |
| TTL 6 | xmit | 6 ms | delay | 70 ms | |
| TTL 7 | xmit | 7 ms | delay | 80 ms | |
| TTL 8 | xmit | 8 ms | delay | 90 ms | |
| TTL 9 | xmit | 9 ms | delay | 100 ms | |
| TTL 10 | xmit | 10 ms | delay | 110 ms | |

Observing a series of packets with added delay gives a good indication of a problem period in the network. As shown in Table 3, it is apparent that an additional 40 ms of delay was introduced which lasted for a period of 3 ms. The introduction of the delay had to have been at the first affected node (TTL=5) or the link between node TTL=4 and node TTL=5.

TABLE 3

| TTL 1  | xmit | 1 ms  | delay | 20 ms  |                                                                                              |
|--------|------|-------|-------|--------|----------------------------------------------------------------------------------------------|
| TTL 2  | xmit | 2 ms  | delay | 30 ms  |                                                                                              |
| TTL 3  | xmit | 3 ms  | delay | 40 ms  |                                                                                              |
| TTL 4  | xmit | 4 ms  | delay | 50 ms  |                                                                                              |
| TTL 5  | xmit | 5 ms  | delay | 100 ms | <-- High probability of additional 40 ms delay introduced at time 5, lasting for period of ~3 ms |
| TTL 6  | xmit | 6 ms  | delay | 110 ms |                                                                                              |
| TTL 7  | xmit | 7 ms  | delay | 120 ms |                                                                                              |
| TTL 8  | xmit | 8 ms  | delay | 90 ms  |                                                                                              |
| TTL 9  | xmit | 9 ms  | delay | 100 ms |                                                                                              |
| TTL 10 | xmit | 10 ms | delay | 110 ms |                                                                                              |

If a node is suspected of introducing delay, the transmitter can automatically adapt to concentrate its testing on a particular segment of the network, and the pattern shown in Table 4 can be transmitted. This should allow the destination endpoint 116 monitoring application to calculate jitter (variance of delay) for a packet which would not result in an ICMP error reply. Since the packet transmitted at xmit time=5 ms contains a delay, in high probability the neighboring delay of TTL=5, and TTL=6 is due to the same source, which is either node TTL=5 (or the link between node TTL=4 and node TTL=5).

TABLE 4

| TTL 2   | xmit | 1 ms  | delay | 30 ms  |                    |
|---------|------|-------|-------|--------|--------------------|
| TTL 3   | xmit | 2 ms  | delay | 40 ms  |                    |
| TTL 4   | xmit | 3 ms  | delay | 50 ms  |                    |
| TTL 5   | xmit | 4 ms  | delay | 100 ms |                    |
| TTL 128 | xmit | 5 ms  |       |        | measured jitter = 40 |
| TTL 6   | xmit | 6 ms  | delay | 110 ms |                    |
| TTL 7   | xmit | 7 ms  | delay | 80 ms  |                    |
| TTL 128 | xmit | 8 ms  |       |        | measured jitter = 0 |
| TTL 8   | xmit | 9 ms  | delay | 90 ms  |                    |
| TTL 9   | xmit | 10 ms | delay | 100 ms |                    |

It can be seen that an independent traceroute packet (many milliseconds away from a neighboring traceroute packet) may be prone to false positive network status indications. Transmitting several successive traceroute packets, however, can yield better indications regarding which node in a part of the network may be introducing loss or jitter. Depending on the duration of the sporadic and bursty network fault state, which may last for periods of just a few milliseconds, the traceroute packets are preferably transmitted in a burst that covers a few milliseconds. This fits exactly into the timing schema for transmitting real-time encoded video over IP (via RTP).

Although the apparatus, system, and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, system, and method, as set forth in the following claims.

What is claimed is:

1. A method comprising:
embedding in-band traceroute packets in traceroute frames that are interspersed with a media stream comprising a plurality of media frames;
transmitting the traceroute frames at a frequency of about once per 1.5 seconds into a network connecting a proximal end point and a distal end point;
monitoring the network for responses, expected from respective traceroute packets, from each of a plurality of network devices that are disposed between the proximal and distal end points;
analyzing the respective responses; and
based on the analyzing step, identifying one or more of the network devices as being responsible for a fault.

2. The method of claim 1, wherein the media steam comprises a high bandwidth video stream or a multiplexed video/audio stream over Internet Protocol (IP).

3. The method of claim 1, wherein the response comprises an Internet Control Message Protocol (ICMP) response.

4. The method of claim 1, further comprising matching a timing of any traceroute frame with a corresponding timing of packets of the media stream.

5. The method of claim 1, further comprising determining a network path and hop distance between the proximal and distal end points.

6. The method of claim 1, further comprising receiving computed end-to-end network loss and jitter from the distal end point, which measures statistics for an entire path being analyzed.

7. The method of claim 1, further comprising correlating un-acknowledged traceroute packets with packet loss at the distal end point.

8. The method of claim 1, further comprising correlating un-acknowledged traceroute packets with jitter between the proximal and distal end points.

9. The method of claim 1, further comprising transmitting the traceroute packets using realtime transport protocol (RTP).

10. The method of claim 1, further comprising assigning sequence values of the traceroute packets such that they are in sequence with sequence values of packets in the media stream.

11. The method of claim 1, further comprising transmitting a traceroute frame about every 45 media frames.

12. An apparatus comprising:
a transmitter configured to be connected to at least one network node that is part of a series of network nodes between the transmitter and a receiver, the transmitter configured to embed in-band traceroute packets in traceroute frames that are interspersed with a media stream comprising a plurality of media frames, transmit the traceroute frames at a frequency of about once per 1.5 seconds into a network connecting the transmitter and the receiver, monitor the network for responses, expected from respective traceroute packets, from each of the series of network nodes that are disposed between the transmitter and the receiver, analyze the respective responses, and based on analysis of the respective responses, identify one or more of the network nodes as being responsible for a fault.

13. The apparatus of claim 12, wherein the fault comprises packet loss.

14. The apparatus of claim 12, wherein the fault comprises jitter.

15. The apparatus of claim 12, wherein the transmitter is configured to receive computed end-to-end network loss and jitter from the receiver.

16. The apparatus of claim 12, wherein the transmitter is configured to assign sequence values of the traceroute packets such that they are in sequence with the sequence values of the packets in the media stream.

17. The method of claim 1, further comprising transmitting about 2400 traceroute frames per hour.

* * * * *